United States Patent Office 3,430,060
Patented Feb. 25, 1969

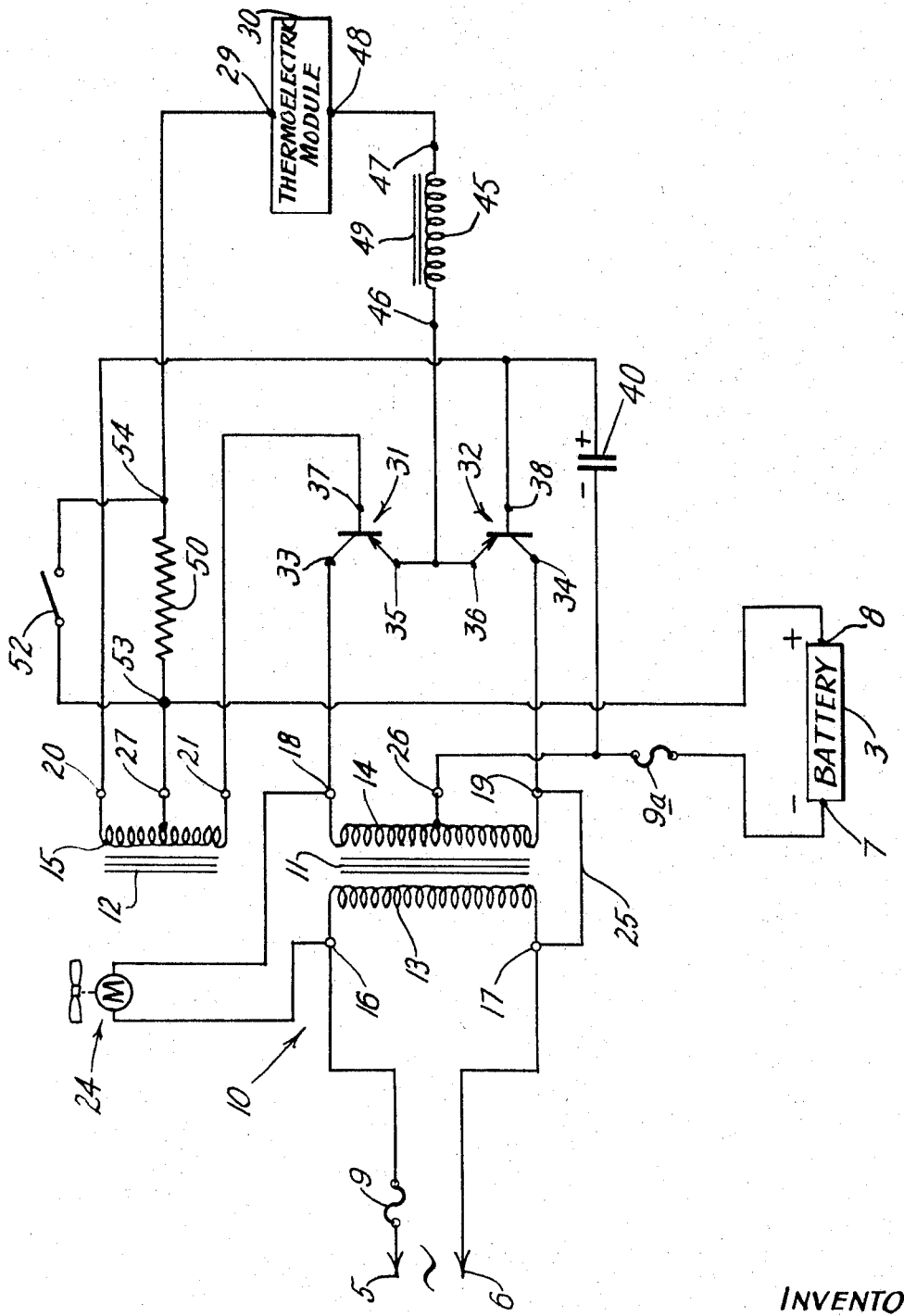

3,430,060
POWER SUPPLY FOR THERMOELECTRIC
APPARATUS
Nicholas D. Glyptis, 16 W. 148 Timberview Drive,
Elmhurst, Ill. 60126
Filed Oct. 22, 1965, Ser. No. 502,240
U.S. Cl. 307—66     12 Claims
Int. Cl. H02j 7/02

ABSTRACT OF THE DISCLOSURE

A power supply for thermoelectric apparatus such as a portable refrigerator, the power supply energized either by commercial alternating current or by direct current such as derived from a battery of, for example, 12 volts. The power supply output is in the voltage range of 3½–7 volts and in the current range of 8–15 amperes. The circuit, which is transistorized, includes a power transformer having a plurality of secondary windings, some of which preferably are of conducting foil, such as aluminum, which serves as a heat sink.

---

This invention relates to a power supply, and more particularly to a power supply for thermoelectric apparatus such as a portable refrigerator.

The power supply of the invention has been developed particularly to meet the low voltage (e.g. 3½–7 volts range), high current (e.g. 8–15 amperes range) requirements of A.C.=D.C. thermoelectric applications, but various features of the invention are advantageous in power supplies for other applications.

One object of the invention is to provide a power supply of the aforesaid character which is electrically efficient, small in size, low in cost and light in weight. These features, of course, are of particular importance in portable thermoelectric refrigerators.

Another object is to provide a power supply which avoids the use of objectionable electrolytic filtering capacitances, and instead employs a filtering inductance.

Still another object is to provide a power supply using a power transformer and filtering inductance of novel character which serve as a sink for heat generated during operation. In preferred form, the power transformer and filtering inductance are integral, and the transformer functions as an autotransformer under certain conditions.

Other objects, advantages and features of the invention will be apparent as the description proceeds, reference being had to the accompanying drawing wherein one form of the invention is shown. It is to be understood that the description and drawing are illustrative only, and that the scope of the invention is to be measured by the appended claims.

In the drawing:

The single figure is a schematic circuit diagram of an A.C.=D.C. power supply and associated thermoelectric module suitable for use in thermoelectric apparatus such as a portable refrigerator.

Referring to FIG. 1 of the drawing, the illustrated power supply of the invention is energized, as mentioned, either by commercial alternating current, such as 117 volts, 60 cycles, or by direct current such as derived from a battery 3 of, for example 12 volts. The alternating current is applied to terminals 5 and 6, while the direct current is applied to terminals 7 and 8. Elements 9 and 9a are fuses.

The power supply includes a power transformer, generally designated 10, having a suitable core 11, 12. Transformer 10 also has a primary winding 13, a first secondary winding 14 and a second secondary winding 15.

First and second secondary windings 14 and 15 may employ conventional wire of adequate cross section to carry the required higher currents. However, in preferred form secondary windings 14 and 15 comprise conducting foil, such as aluminum foil in strip form, which has good conductivity and requires minimum space. It also provides significant saving in weight. Such foil is particularly advantageous for thermoelectric applications in that it provides an efficient sink for the heat that develops during operation of the power supply and has large area in contact with insulation, improving heat flow. By way of example, the foil may have a thickness of 0.0010 inch and a width of about one inch.

Primary winding 13 has terminals 16 and 17 that are connected respectively to alternating current terminals 5 and 6.

First secondary winding 14 has terminals 18 and 19, while second secondary winding 15 has terminals 20 and 21.

In the illustrated power supply which is designed for a thermoelectric refrigerator, provision is made for energizing an electric fan used to cool the hot side of a thermoelectric module. Thus, a fan 24 is adapted to be connected between corresponding terminals of the primary and first secondary windings, namely, between terminals 16 and 18.

In order to provide or insure proper voltage for fan 24 during D.C. operation, a conductor 25 is connected between the corresponding other terminals of the primary and first secondary windings, namely, between terminals 17 and 19. This connection is effective to provide a voltage boost when the power supply is energized from a direct current source such as a 12 volt battery.

First secondary winding 14 has an intermediate tap 26 connected to terminal 7 of the D.C. source, while second secondary winding 15 has an intermediate tap 27 connected to terminal 8 of the D.C. source. Tap 27 also is adapted to be connected, directly, or through other circuit elements, to one terminal 29 of associated thermoelectric module 30.

The power supply of the invention also includes a pair of semiconductor devices which during A.C. operation function in circuit as rectifiers and during D.C. operation function in circuit as elements in a multivibrator and as rectifiers. These devices, shown as PNP-n type base transistors, are designated 31 and 32. Delco transistors DTE 5411 RB have been found satisfactory for use in the invention.

Collector terminal 33 of transistor 31 and collector terminal 34 of transistor 32 are connected respectively to terminals 18 and 19 of first secondary winding 14, while emitter terminals 35 and 36 of the two transistors are connected together. Base terminal 37 of transistor 31 and base terminal 38 of transistor 32 are connected respectively to terminals 21 and 20 of second secondary winding 15. As mentioned, transistors 31 and 32 function as rectifiers during A.C. operation and as elements in a multivibrator and as rectifiers during D.C. operation.

From the foregoing, it will be seen that power transformer 10 with conductor 25 has autotransformer action during A.C. operation, the voltage cancellation effect serving to reduce the applied voltage to the value required for fan 24. Alternatively, during D.C. operation power transformer 10 functions as a three winding transformer, instead of an autotransformer, to increase the voltage to the value required for the fan.

A multivibrator-starting capacitance 40 desirably is connected between the base terminal of one transistor, for example terminal 38 of transnistor 32, and an intermediate tap on one of the secondary windings, for example tap 26 on first secondary winding 14. Capacitance 40, which may have values of 50 mfd. and 150 volts D.C., provides an imbalance insuring proper multivibrator action.

A choking or smoothing inductance 45 has one terminal 46 connected to the base terminals 35, 36 of the transistors and the other terminal 47 adapted to connect to other terminal 48 of thermoelectric module 30. Inductance 45 has a core 49, and while it may be provided with a conventional winding, it is preferred that the winding be of conducting foil such as aluminum foil, as in the case of first and second secondary windings 14 and 15. Again, the conducting foil has desirable conductivity for the higher currents, and, in addition, functions as a heat sink.

Choking inductance 45 may be a separate circuit element, but in preferred form it advantageously is integral with power transformer 10. By combining the inductance 45 with power transformer 10 as a third secondary, savings in core material is achieved, as well as space and weight reduction and improved electrical efficiency.

As illustrated, the power supply of the invention also includes a resistance 50 (e.g. one ohm, 25 watts) and a manual switch 52 connected in parallel with each other, one terminal 53 thereof connected to intermediate tap 27 of second secondary winding 15 and the other terminal 54 thereof adapted to connect to terminal 29 of thermoelectric module 30. Switch 52 is closed to establish D.C. operation, while resistance 50 performs a dropping function to conserve D.C. power during periods of low power consumption.

A number of features of the invention are applicable to power supplies of A.C. characteristic only. Such power supplies omit the illustrated circuitry peculiar to D.C. operation, and normally use semiconductor rectifiers instead of transistors. They advantageously use conducting foil in the power transformer, and a filtering inductance integral with the transformer. The inductance, as before, optionally may employ foil.

From the foregoing, it is believed that the construction and advantages of the invention will be readily apparent to those skilled in the art. Having thus described the invention, what is claimed as new and desired to be secured by Letters Patent is:

1. A power supply for thermoelectric apparatus comprising:
  a power transformer having a primary winding connected to an A.C. power source and first and second secondary windings, intermediate taps on said first and second secondary windings connected to a D.C. power source, the intermediate tap on said second secondary winding connected to one terminal of a thermoelectric module;
  a pair of transistors having collector terminals respectively connected to the terminals of said first secondary winding, emitter terminals connected together and base terminals respectively connected to the terminals of said second secondary winding, said transistors during A.C. operation functioning as rectifiers and during D.C. operation as elements in a multivibrator and as rectifiers; and
  a choking inductance having one terminal connected to the base terminals of said transistors and the other terminal connected to the other terminal of the thermoelectric module.

2. The power supply of claim 1 with the addition of a multivibrator-starting capacitance connected between the base terminal of one of said transistors and an intermediate tap on one of said secondary windings to provide an imbalance.

3. The power supply of claim 1 with the addition of an electric fan, and wherein corresponding terminals of said primary and first secondary windings are connected to said electric fan and the other corresponding terminals of said primary and first secondary windings are connected together to provide a voltage boost effective during D.C. operation to insure requisite fan action.

4. The circuit of claim 1 with the addition of a resistance and switch connected in parallel with each other, one terminal thereof connected to the intermediate tap on said second secondary winding and the other terminal connected to said one terminal of the thermoelectric module, said switch closed for D.C. operation.

5. The power supply of claim 1 wherein said first and second secondary windings are of conducting foil, said foil serving as a heat sink.

6. The power supply of claim 5 wherein said conducting foil is aluminum foil in strip form.

7. The power supply of claim 1 wherein said choking inductance is integral with said power transformer.

8. The power supply of claim 1 wherein the winding of said choking inductance is of conducting foil, said foil serving as a heat sink.

9. The power supply of claim 8 wherein said conducting foil is aluminum foil in strip form.

10. The power supply of claim 8 wherein said choking inductance is integral with said power transformer.

11. A power supply comprising:
  a power transformer having a primary winding connected to an A.C. power source and first, second and third secondary windings, an intermediate tap on said second secondary winding connected to one terminal of a thermoelectric module;
  a pair of semiconductor devices having collector terminals respectively connected to the terminals of said first secondary winding, base terminals respectively connected to the terminals of said second secondary winding and emitter terminals connected together, one terminal of said third secondary winding connected to the other terminal of the thermoelectric module, the other terminal of said third secondary winding connected to said emitter terminals, said third secondary winding functioning as a choking inductance.

12. The power supply of claim 11 wherein said secondary windings are of conducting foil, said foil serving as a heat sink.

References Cited
UNITED STATES PATENTS 2,785,236   3/1957   Bright et al. _____ 331—113.1

ROBERT K. SCHAEFER, *Primary Examiner.*

H. J. HOHAUSER, *Assistant Examiner.*

U.S. Cl. X.R.
307—29; 331—113